(12) United States Patent
Huang et al.

(10) Patent No.: US 6,839,425 B1
(45) Date of Patent: Jan. 4, 2005

(54) INTEGRATED ANALOG/DIGITAL TELEPHONE NETWORK INTERFACE CIRCUIT DESIGN

(75) Inventors: William Huang, Alameda, CA (US); Weijia Wang, Alameda, CA (US); Haixian Liu, Beijing (CN)

(73) Assignee: UT Starcom, Inc., Alameda, CA (US)

( * ) Notice: Subject to any disclaimer, the term of this patent is extended or adjusted under 35 U.S.C. 154(b) by 0 days.

(21) Appl. No.: 09/239,566

(22) Filed: Jan. 29, 1999

Related U.S. Application Data
(60) Provisional application No. 60/073,127, filed on Jan. 30, 1998.

(51) Int. Cl.[7] .................................................. H04M 1/00
(52) U.S. Cl. .............................. 379/399.01; 379/93.05; 379/93.09
(58) Field of Search ........................... 379/93.05, 93.06, 379/93.07, 93.08, 93.09, 399.01

(56) References Cited

U.S. PATENT DOCUMENTS

| | | | | |
|---|---|---|---|---|
| 5,255,317 A | * | 10/1993 | Arai et al. ............. | 379/399.02 |
| 5,815,505 A | * | 9/1998 | Mills ...................... | 379/399.01 |
| 6,282,238 B1 | * | 8/2001 | Landry .................... | 379/93.05 |
| 6,408,056 B1 | * | 6/2002 | Bremer et al. ........... | 379/93.05 |

* cited by examiner

*Primary Examiner*—Xu Mei
*Assistant Examiner*—Jefferey Harold

(74) *Attorney, Agent, or Firm*—Claude A.S. Hamrick; Justin Boyce; Felix L. Fischer

(57) ABSTRACT

A remote terminal for use at an access network node of a network provides a plurality of telecommunications services, the remote terminal providing selected ones of the telecommunications services to at least one corresponding terminal device. The telecommunications services provided by the network include a plain old telephone service (POTS), a an integrated service digital network service (ISDN), and internet services such as xDSL. In one embodiment, the remote terminal comprises: a digital signal processor coupled for communication with the network, the digital signal processor having a plurality of terminal ports; and a plurality of subscriber line interface circuit (SLIC's), each of the SLIC's providing an interface between a corresponding one of the terminal ports and at least one corresponding terminal device, the digital signal processor being configured to provide selected ones of the telecommunications services to corresponding ones of the terminal devices. In another embodiment, the remote terminal comprises: a digital signal processor coupled for communication with the network; a subscriber line interface circuit (SLIC) providing communication between a particular terminal device and the digital signal processor; a memory unit for storing computer readable instructions for execution by the digital signal processor, the instructions for implementing an adaptive telecommunications service process including the steps of: automatically determining a selected one of the telecommunications services required by the particular terminal device, and providing the selected telecommunications service to the particular terminal device.

17 Claims, 13 Drawing Sheets

INTEGRATED ANALOG/DIGITAL TELEPHONE NETWORK INTERFACE CIRCUIT DESIGN

CROSS REFERENCE TO RELATED APPLICATIONS

This application claims priority to U.S. Patent Application Ser. No. 60/073,127, filed Jan. 30, 1998, entitled "An Integrated Analog/Digital Telephone Network Interface Circuit Design", which is incorporated herein by reference.

BACKGROUND OF THE INVENTION

1. Field of the Invention

The present invention relates generally to methods and apparatus for providing telecommunications services to end user terminals. More specifically, the present invention relates to a line card for use in a remote terminal at an access network node, the line card including an adaptive subscriber line interface circuit (SLIC).

2. Description of the Prior Art

In the telecommunications industry, large scale copper wire loop plants are commonly used to support analog telephones by providing a plain old telephone service (POTS). The commercial importance of using copper wire loop plants to deliver digital services, such as an integrated services digital network (ISDN), in place thereof is increasing all over the world. A new type of service, known as an "x" type digital subscriber line (xDSL) service, has also been successfully introduced into the local loop. For purposes of describing the present invention, xDSL services refers to all common types of digital subscriber line services including asymmetric digital subscriber line (aDSL) services, high speed digital subscriber line (hDSL) services, and single pair digital subscriber line (sDSL) services. An access interface is designed to connect the central office equipment, such as a switch or a router, to the subscriber over the copper wire loop. This interface is known as the network interface.

In conventional systems, an analog interface, known as a subscriber line interface circuit (SLIC), is used to connect to a standard telephone to provide a POTS service. A digital interface, known as the ISDN "U" interface, is used to connect to a ISDN terminal to provide the ISDN BRI 2B+D services. Another digital interface, known as an xDSL interface, is used to provide internet access to an end user terminal device.

In prior art systems, in order to provide different types of telecommunications services, telecommunications operators must use different network interface ports to interface with different subscribers. Each of a plurality of copper wire loops is designated to provide one type of service. The subscriber must only use the loop that is connected to his house for a single designated service.

A local subscriber line is connected to a subscriber between the network interface of the switch and the subscriber terminal. For example, a subscriber might have the option of signing up the service for either POTS or ISDN. When the subscriber is signed up with POTS, the copper loop is connected to a POTS line card. Subscriber line interfaces for a POTS line card commonly provide BORCHT functions and PCM Codec functions. ISDN coding functions include 2B1Q coding and 2B+D functions. When the subscriber is signed up with ISDN service, the copper loop is connected to a ISDN line card. There is no mix and match for the line cards.

SUMMARY OF THE INVENTION

The present invention provides a remote terminal for use at an access network node of a network providing a plurality of telecommunications services, the remote terminal providing selected ones of the telecommunications services to at least one corresponding terminal device. The telecommunications services provided by the network include POTS, ISDN, and internet services such as xDSN.

In one embodiment, the remote terminal comprises: a digital signal processor coupled for communication with the network, the digital signal processor having a plurality of terminal ports; and a plurality of subscriber line interface circuits(SLIC's), each of the SLIC's providing an interface between a corresponding one of the terminal ports and at least one corresponding terminal device, the digital signal processor being configured to provide selected ones of the telecommunications services to corresponding ones of the terminal devices.

In another embodiment, the remote terminal comprises: a digital signal processor coupled for communication with the network; a subscriber line interface circuit (SLIC) providing communication between a particular terminal device and the digital signal processor; a memory unit for storing computer readable instructions for execution by the digital signal processor, the instructions for implementing an adaptive telecommunications service process including the steps of: automatically determining a selected one of the telecommunications services required by the particular terminal device, and providing the selected telecommunications service to the particular terminal device. The SLIC includes a protection circuit, and means for providing BORCHT functions and PCM Codec functions.

A line card of the remote terminal of the present invention may be manually or automatically reconfigured to either POTS or ISDN applications. This dual-use line card can be used to offer either POTS or ISDN services by either software configuration or automatic line detection. Using this approach, the operator will only need one kind of line card for multiservice deployment.

The design of the ISDN U interface is based on the ANSI T1S1 specification. The SLIC may include an ISDN U echo canceling transceiver chip. The SLIC provides xDSL functions using digital signal processing as a DSL interface circuit. The SLIC also provides data over voice design functions Advantages of the present invention include high performance, low cost, and ease of development.

An important advantage of the present invention is that a single line card may be used to provide selected ones of a plurality of services to an end user terminal. Because a single line card port, and copper wire loop may be used to selectively provide a plurality of services to an end user terminal, hardware costs are minimized.

The foregoing and other objects, features, and advantages of the present invention will be apparent from the following detailed description of the preferred embodiment which makes reference to the several figures of the drawing.

IN THE DRAWINGS

FIG. 1 is a schematic block diagram of a multi-service network system according to the present invention including: central office telecommunications equipment providing a plain old telephone service (POTS), an integrated services digital network (ISDN) service, and internet service; and an access network node having an intelligent and adaptive subscriber line interface circuit (SLIC circuit) in accordance with the present invention;

DETAILED DESCRIPTION OF THE PREFERRED EMBODIMENTS

The invention herein provide an integrated approach for designing the network interface circuit that allow a telecom operator to offer different services from the same network port and will allow the subscribers to use different services over the same copper wire loop.

This invention provides a network interface that is capable of terminating both a traditional loop start POTS line and at the same time, a ISDN BRI 2B1Q line, and a xDSL line. A method of implementing a transformer less POTS and ISDN compatible SLIC circuit is provided. A method of implementing a combined voice CODEC and ISDN 2B1Q echo canceller with advanced features such as impedance control, gain control, echo cancel is provided. A method of implementing a combined switched and packet interface is also provided. A network interface in accordance with the present invention provides a method of automatically detecting a type of service required by a particular terminal device which is connected to the interface, and switching to a mode of operation providing the service required by the particular terminal device. This new type of SLIC could greatly help the deployment of N-ISDN services in the telecommunication market. Thus a great potential is recognized where the line speed of the interface can be different from ISDN BRI to interface compatibility. Additional ideas could turn the SLIC into a software driven system where newer modulation scheme can continuously be introduced both in a more advance POTS (better voice quality and voice codec) and newer xDSL schemes.

Telephony Network Interface Architecture

An integrated network line interface circuit allows the port to be connected to two different types of terminal devices at the same time. Depending which terminal is activated, the network interface is operative to provide the compatible services to that terminal.

In all cases a conventional analog telephone or a ISDN terminal can be connected to the integrated network interface circuit while each connection is providing a compatible service to its respective terminal.

The present invention provides a telecommunications subscriber line interface providing combined POTS and/or ISDN service at the same time. One subscriber may use regular telephone (POTS) and ISDN terminal over the same copper loop at the same time. An advantage of using this approach is that a customer need not buy an ISDN terminal for voice service.

The present invention provides a subscriber line interface providing combined POTS and xDSL services for internet access application. The subscriber interface simultaneously supports POTS and data over voice application. The subscriber interface supports POTS and superior voice services. When a superior CODEC is detected end to end, the CODEC provided by the SLIC, provides an improved voice encoding mechanism to support better voice quality by employing data transmission over the loop.

Figure 1:
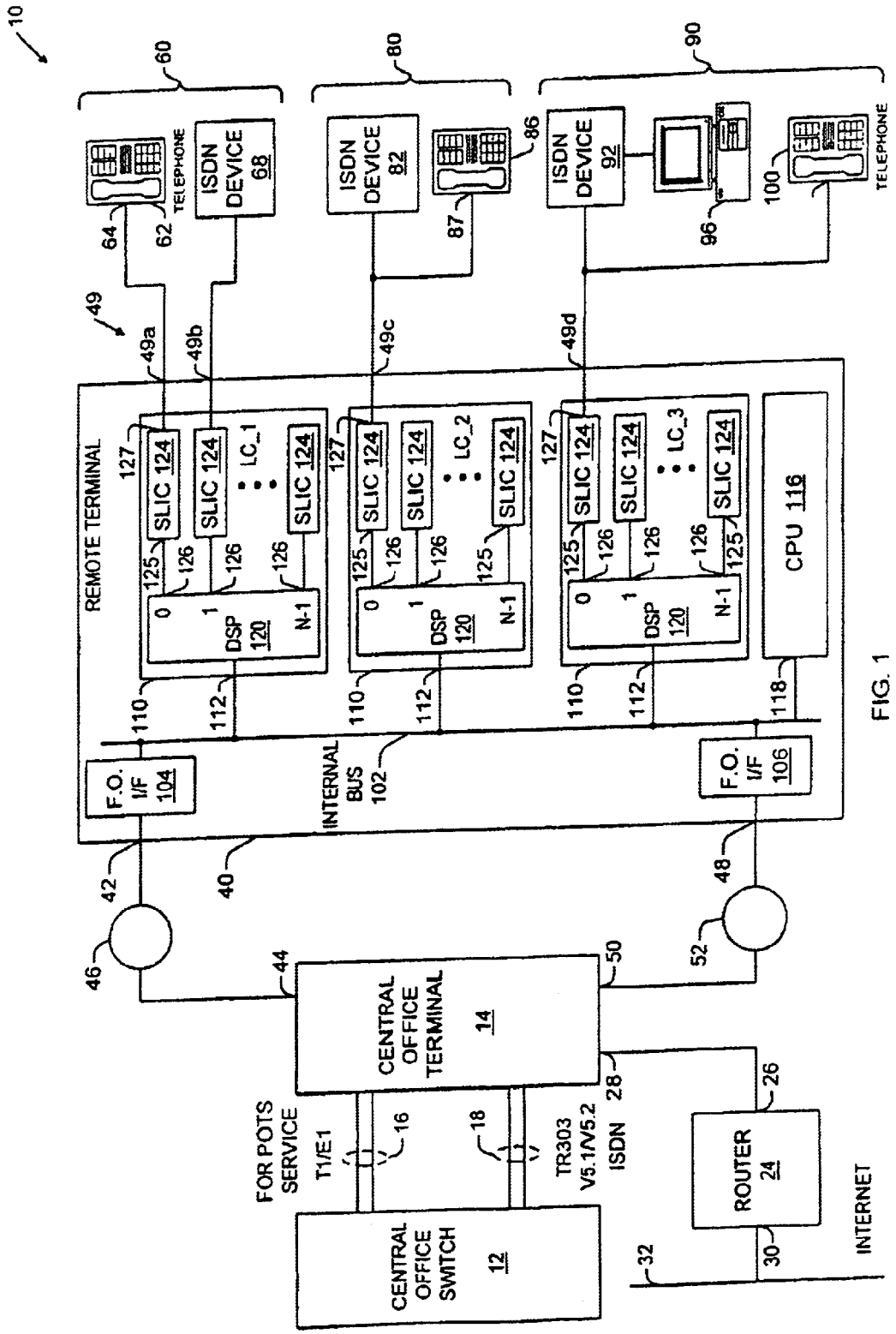

FIG. 1 shows a schematic block diagram at 10 of a multiservice network system according to the present invention including: central office telecommunications equipment providing a plain old telephone service (POTS), an integrated services digital network (ISDN) service, and internet service (such as xDSL, a digital subscriber line service); and an access network node including at least one line card having an intelligent and adaptive subscriber line interface circuit (SLIC circuit) in accordance with the present invention, the access network node being coupled to communicate with the central office telecommunications equipment via a fiber optic link.

The central office equipment includes: a central office switch 12; a central office terminal 14 coupled for communication with switch 12 via a POTS service link 16 which may be a T1/E1 link, and also coupled with the switch 12 via an ISDN link 18 which may be a TR303 or V5.1/V5.2 type of link for providing ISDN services; a router 24 having a port 26 coupled for communication with a port 28 of the central office terminal 14, and a port 30 coupled for communication with an internet 32.

The access network node includes: a remote terminal 40 having a fiber-optic link port 42 coupled for communication with a port 44 of the central office terminal 14 via a first fiber-optic link 46, a second fiber-optic link port 48 coupled for communication with a port 50 of the central office terminal via a second fiber-optic link 52, and a plurality of terminal ports 49; a first end user site 60 including a telephone 62 having a port 64 coupled for communication with a first port 49a of the remote terminal 40, and an ISDN device 68 coupled for communication with a second port 49b of the remote terminal 40; an automatic mapping service user site 80 including an ISDN device 82 coupled for communication with a third port 49c of the remote terminal, and a telephone 86 which is also coupled for communication with the remote terminal via the third port 49c; and a data over voice application user site 90 having an ISDN device 92 coupled for communication with a fourth port 49d of the remote terminal 40, a personal computer 96 coupled for communication with the ISDN device 92, and a telephone 100 which is also coupled for communication with the remote terminal via its fourth port 49d.

The remote terminal 40 includes an internal bus 102; a fiber-optic interface 104 coupling bus 102 to fiber-optic link port 42; a fiber-optic link interface 106 for coupling bus 102 to fiber-optic link port 48; and a plurality line cards 110 each having a port 112 coupled for communication with the internal bus 102; and a central processing unit (CPU) 116 having a port 118 coupled for communication with the internal bus 102. The internal bus 102 may be a time division multiplexing (TDM) serial bus or sequenced terminal (ST) bus.

Each of the line cards 110 includes: at least one digital signal processor (DSP) 120; and a plurality of N subscriber line interface circuits (SLIC circuits) 124 in accordance with the present invention, each SLIC circuit having a port 125 coupled to communicate with a corresponding one of N ports 126 of the DSP 120, and a subscriber side port, or terminal port 127 coupled to communicate with a terminal device via one of the terminal ports 49 of the remote terminal. In one embodiment, each of the line cards 110 includes one DSP 120, and N=4 of the SLIC circuits 124, each being coupled to one of four ports 126 of the DSP 120. In alternative embodiments, each of the line cards 110 may include one DSP 120, and one of the SLIC circuits 124 coupled to a port 126 of the DSP 120. The design choice is based on the capacity of the DSP 120 used.

As further explained below, in accordance with the present invention, each of the line cards 110 is operative to detect the type of a remote device connected therewith. For example, the first of the line cards 110, designated LC_1, automatically detects that the end user device 64 coupled to port 49a is a telephone requiring POTS service. LC_1 also automatically detects that the end user device 68 coupled to port 49b is an ISDN device requiring ISDN service.

For the automatic mapping service user site 80, which includes the ISDN device 82 and telephone 86 both coupled for communication with port 49c, the second of the line cards 110, designated LC_2, automatically detects which of the end user devices (ISDN device 82, or telephone 86) is currently activated, on line, or off the hook. For the data over voice application user site 90, which includes ISDN device 92 coupled with PC 96, and telephone 100 both coupled for communication with port 49d of the remote terminal 40, the third line card 110, designated LC_3, automatically detects which of the end user devices (ISDN device 92, or telephone 100) is currently activated.

The DSP 120 executes software (not shown) according to the present invention, further described below, for automatically detecting the type of end user device coupled to the corresponding port. After determining the type of end user device, the DSP 120 communicates with the central office terminal 14 via a channel set up in the fiber-optic link 46, 52 in accordance with a control signal protocol to indicate the type of service required at a particular one of the end user ports of the line card. The central office terminal 14 and remote if terminal 40 provide a services mapping function to provide each of the end user devices with the type of telecommunication service it requires; ISDN, POTS, or an internet service.

For example, if the third line card 110, designated LC_3, detects that ISDN device 92 coupled with PC 96 is currently activated, IC_3 of the remote terminal communicates with the central office terminal 14 via a channel set up in the fiber-optic link to indicate that internet service is required at port 49d. The central office terminal 14 and remote terminal 40 respond by executing services mapping functions to provide internet service to the data over voice application user site 90 via port 49d of the remote terminal.

Figure 2:
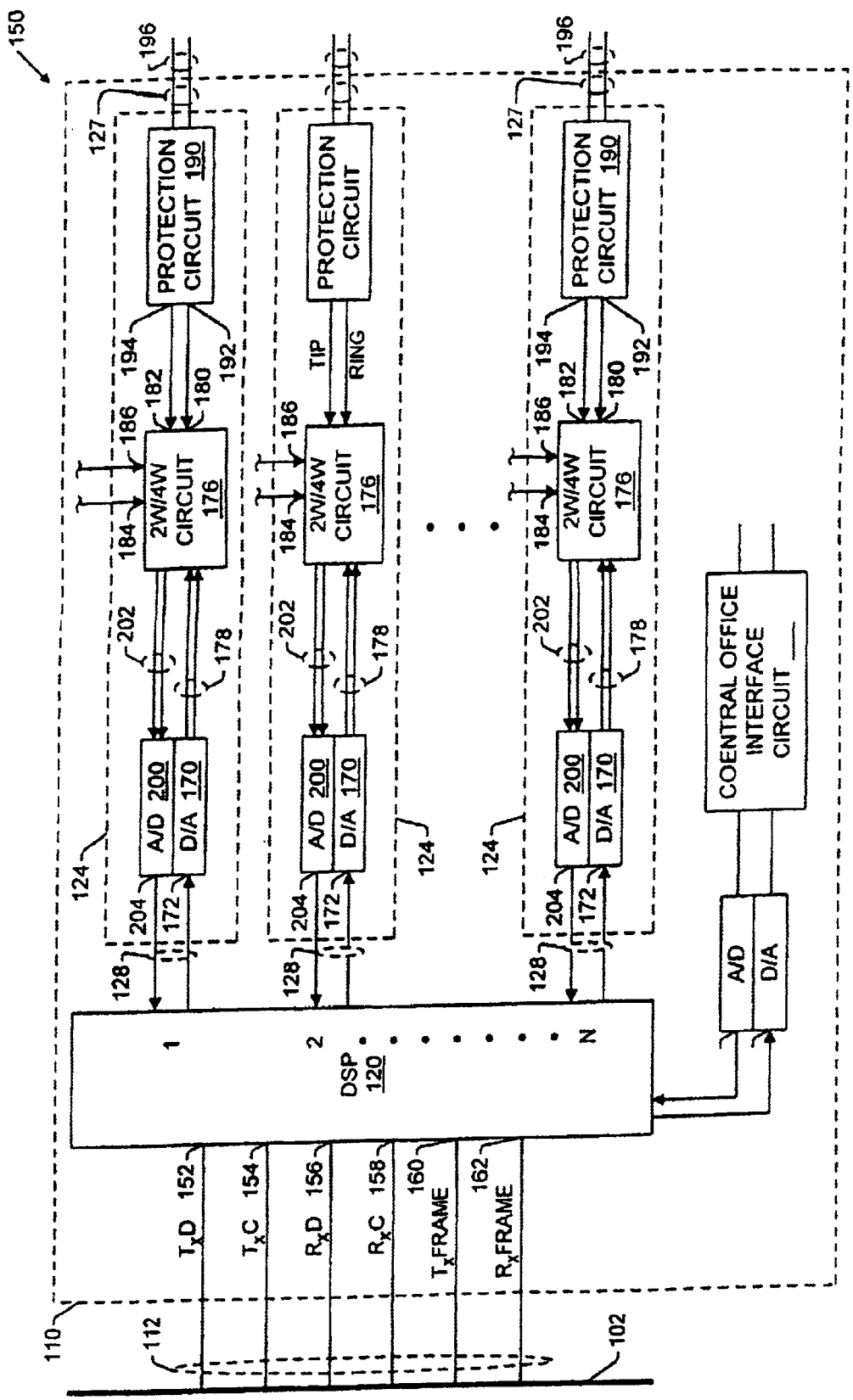
FIG. 2 is a schematic block diagram of a line card of a remote terminal, the line card including a digital signal processor.

FIG. 2 shows a schematic block diagram at 150 of one of the line cards 110 of the remote terminal 40 (FIG. 1). The depicted line card 110 includes the DSP 120 which has a first port 152 coupled to receive a transmit data signal ($T_XD$) from the internal bus 102 via port 112 of the line card 110, a port 154 coupled to receive a transmit data clock signal ($T_XC$) from the internal bus via port 112, a port 156 coupled to receive a receive data signal ($R_XD$) from the internal data bus, a port 158 coupled to receive a receive data clock signal ($R_XC$) from the bus, a port 160 coupled to receive a transmit frame signal ($T_X$FRAME) from the bus, and a port 162 coupled to receive a receive frame signal ($R_X$FRAME) from the bus; and a plurality of N of the SLIC circuits 124 (FIG. 1A).

Each of the SLIC circuits 124 includes: a digital to analog conversion circuit (D/A conversion circuit) 170 having a port 172 coupled to receive digitally encoded information from a corresponding one of the plurality of N ports 128 of DSP 120; a two-wire/four-wire hybrid circuit 176 having an input port coupled to receive analog information from D/A conversion circuit 170 via a first wire pair 178, a ring port 180, a tip port 182, a DC port 184 coupled to 24/48 VDC power supply, and an RING port 186 coupled to receive 90 VAC; a protection circuit 190 having a ring port 192 connected to the ring port 180 of circuit 176, a tip port 194 connected to tip port 182 of circuit 176, and an output port 196 for communicating with a corresponding one of the end user ports 49a, 49b, 49c, 49d (FIG. 1); and an analog to digital conversion circuit (A/D conversion circuit) 200 having an input port coupled to receive analog encoded information from the circuit 176 via a second wire pair 202, and an output port 204 coupled to provide digitally encoded information to the corresponding one of the ports 128 of DSP 120.

In accordance with the present invention, each of the line cards 110 provides additional digital signal processing functions including coding and decoding (CODEC) functions, and echo cancellation functions.

Each of the line cards 110 is: adaptive to different impedance specifications; adaptive to different line balances; adaptive to different gains, and PCM codes including a-law and u-law.

In one embodiment, software is provided for execution in each of the line cards 110 to provide an enhanced PCM CODEC using 64 Kbps transmission (for better voice quality using compression).

The present invention also provides a method for testing the subscriber line either toward switch or towards subscriber using built-in software with-in the line cards 110. A rate adaptive mechanism is provided for expanding the digital bandwidth of the DSL loop.

In one embodiment, the line card provides selectable TDM and ATM interfaces.

Additional features and functions include: an integrated PCM CODEC/SLIC and ISDN U LIU; serial and parallel interfacing; circuit and packet mode operation; BORCHT and codec integration along with data over voice; remote powering for both POTS and ISDN U; support for trunk interface (COIC) application.

Each of the line cards is adaptive to varying impedance, and varying transmit/receive gain standards of the different telecommunication standards of different countries. Each of the line cards includes software for automatically processing long and short reach balance. Each of the line cards also provides: flexible coding and decoding for A law, u law and linear signals; detection and generation of extra functions for DTMF, FSK, TONE; and internal and external diagnostic functions.

In one embodiment, DSP capability is defined by parameters: ISDN 5–10 mips; A/D 100 khz/ISDN port; 8 khz/SLIC; and D/A 100 khz.

Each of the line cards is controllable, that is programmable, to selectively provide interfaces including an analog interface, an ISDN'U' interface, a loop starting interface, and a HDLC interface. The ISDN 'U' is configurable to NT or LT, and provides remote power. Automatically ISSDN, loop starting trunk, and analog phone device.

Each of the SLIC's 124 provides BORCHT functions, automatically balancing, and ring tripping.

A digital side interface provides for Serial PCM 2.048, 4.096, and 8.192 Mb/s input/output; two synchronizers for a difference direction; and microprocessor interfaces Analog interface internal functions include programmable impedance, programmable gain, and selectable coding.

For ISDN, the line card provides transmit and receive rules, echo cancellation, and automatically adjusting gain.

One implementation includes: quad-channel with light-weight front-end hybrid circuits; a transformer-less ISDN U interface design; a unique line balance control scheme; a band pass filter design that works for both voice signals and ISDN 2B1Q signals; methods for detecting analog phone terminals, and ISDN U terminals; and methods for detecting dynamically switching between analog phone service and digital ISDN U interface services.

Figure 3:
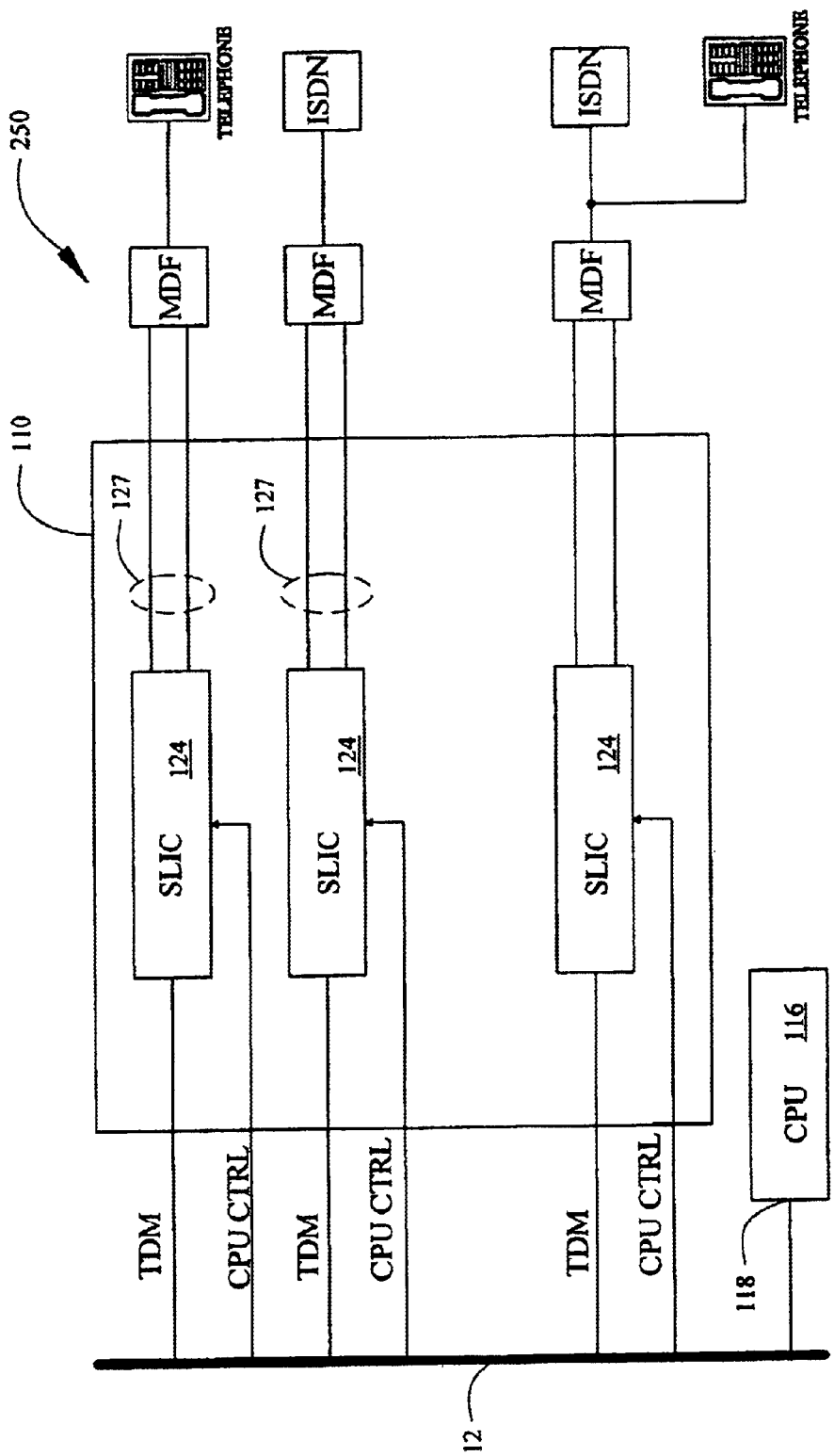
FIG. 3 is a block diagram of a software reconfigurable line card in accordance with the present invention.

The present invention also provides: an integrated approach for implementing PCM CODEC and ISDN echo canceller circuit functions in a DSP; and a special protection circuit for both analog and digital application;

FIG. 3 shows a block diagram at 250 of a software reconfigurable line card implementation. In this embodiment, each of the SLIC circuits 124 of the line card 110 is coupled to receive TDM signals as well as CPU control signals from the CPU 116 via the internal bus 112.

Figure 4:
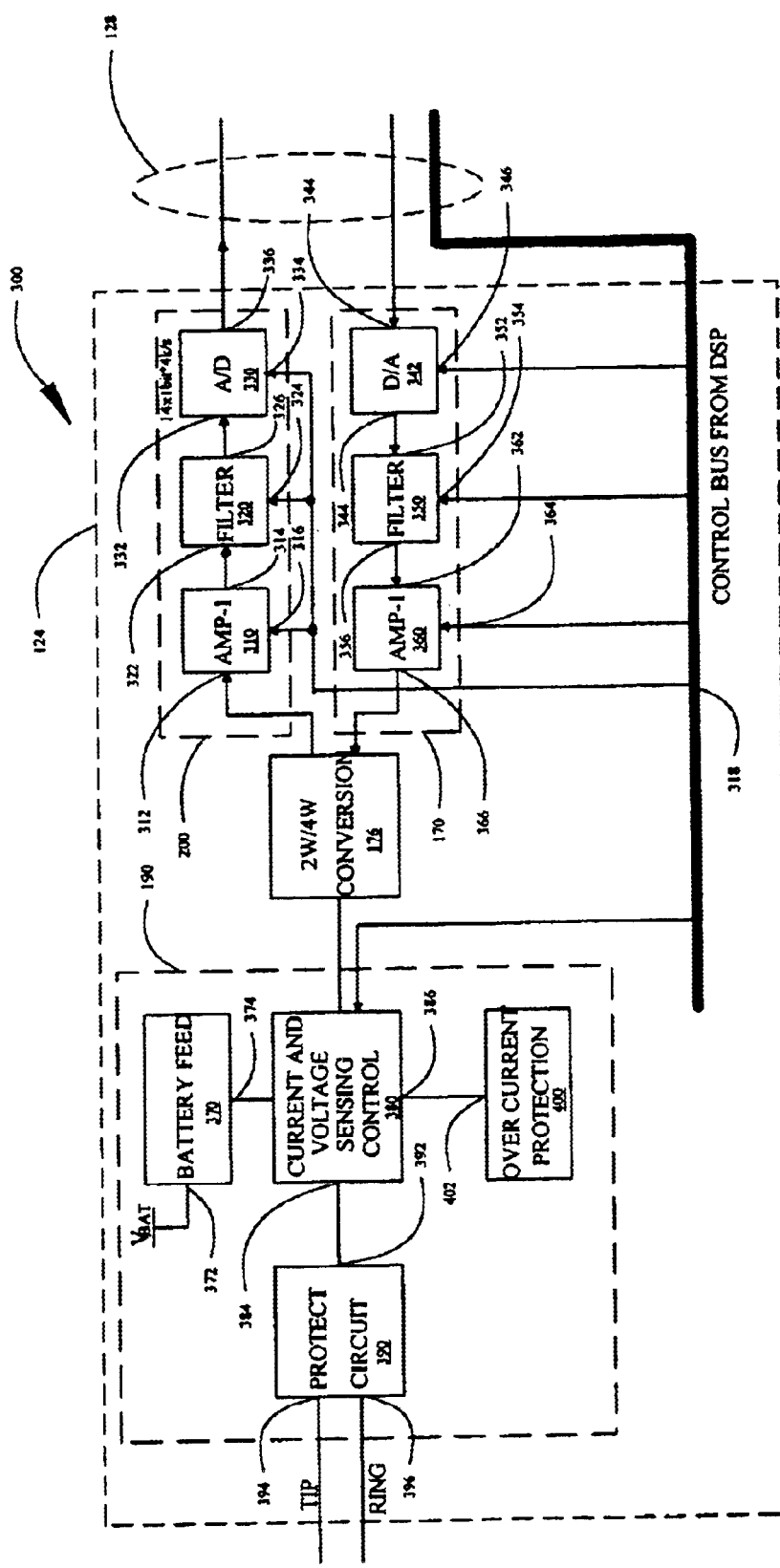
FIG. 4 is a block diagram illustrating details of one of the SLIC circuits of FIG. 1.

FIG. 4 shows a block diagram at 300 illustrating details of one of the SLIC circuits 124 (FIG. 1) in accordance with an embodiment of the present invention. In the depicted embodiment, the SLIC circuit 124 includes a control bus 318 coupled to the digital signal processor 120 (FIG. 1) via the port 128. The A/D conversion circuit 200 includes: an amplifier 310 including an input 312 coupled to receive an analog signal from the circuit 176, an output 314, and a control input 316 coupled to receive a control signal from DSP (FIG. 2) via the control bus 318; a filter 320 having an input 322 coupled to receive an amplified signal from output 314 of amplifier 310, a control input 324 coupled to receive a control signal from the DSP via bus 318, and an output 326; and an A/D converter 330 having an input 332 coupled to receive a signal from output 322 of filter 320, a control input 334 coupled to receive a control signal from the DSP via bus 318, and an output 336 coupled to provide a signal carrying digitally encoded information to the DSP 120 (FIG. 2) via port 128. In one embodiment, the A/D converter 330 operates at a sample rate of 14×1 bit ×4 k/s, or 8×1 bit ×80 k/s.

The D/A conversion circuit 170 of the SLIC circuit 124 includes: a digital to analog converter (D/A converter) 342 having an input 344 coupled to receive a digitally encoded signal from DSP 120 (FIG. 2) via port 128, a control input 346 coupled to receive a control signal from the DSP via control bus 318, and an output 344 providing an analog signal; an input filter 350 having a data input 352 coupled to receive the analog signal from the D-A converter 342, a control input 354 coupled to receive a control signal from the DSP via the control bus 318, and output 356 coupled to provide a filtered analog signal; and an input amplifier 360 having an input 362 coupled to receive the filtered analog signal, a control input 364 coupled to receive a control signal from the DSP via the control bus 318, and an output 366 coupled to provide an analog signal to the conversion circuit 176. In one embodiment, the D/A converter 342 operates at a sampling rate of 14×1 bit ×8 k/s, or 8×1 bit ×80 k/s.

The protection circuit 190 includes: a battery feed unit 370 having an input 372 coupled to a voltage supply providing a voltage level $V_{BAT}$, and an output 374; a current and voltage sensing control unit 380 having an input 382 coupled to output 374 of the battery feed unit, a port 384, and a port 386; a protect circuit 390 having an input 392, a tip output 394, and a ring output 396; and an over-current protection unit 400 having a port 402 connected to port 386 of the unit 380. The protection circuit 190 is software configurable. The current and voltage sensing control unit 380 is responsive to control signals provided by the digital signal processor and operative to vary current and voltage threshold parameters.

Figure 5:
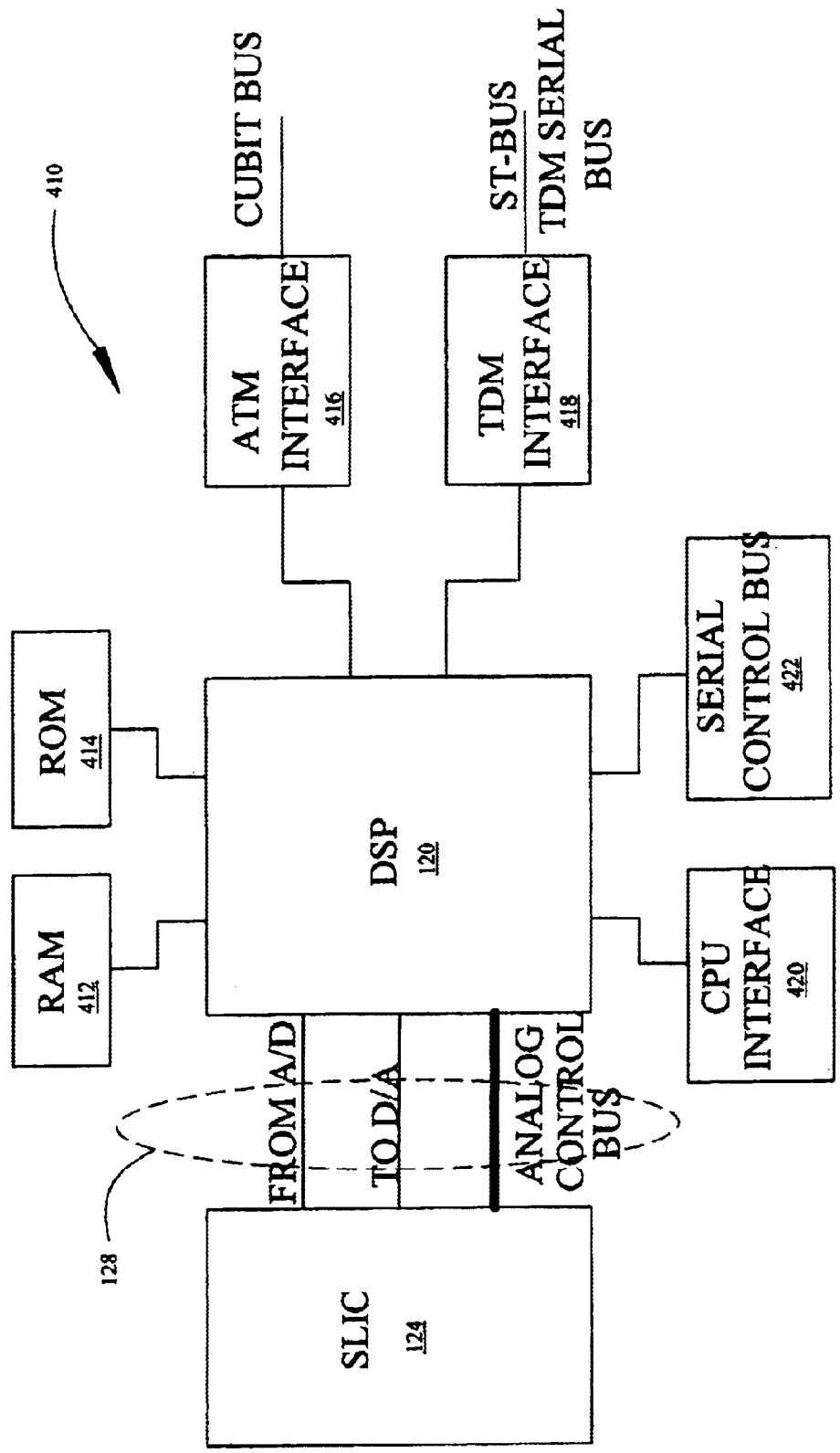
FIG. 5 shows a block diagram of an alternative embodiment of one of the line cards of the remote terminal of FIG. 1, the line card providing including a TDM interface, and an ATM interface.

FIG. 5 shows a block diagram at 410 of an alternative embodiment of one of the line card 110 of the remote terminal (FIG. 1). The depicted line card includes a random access memory (RAM) 412 coupled for communication with the DSP 120; a read-only memory (ROM) 414 coupled for communication with the DSP 120; the SLIC circuit 124 coupled for communication with the DSP; an ATM interface 416 coupled to provide communication with an ATM network via a CUBIT bus; a TDM interface 418 coupled to provide communication with the TDM network via a TDM serial bus or ST bus; a CPU interface 420; and a serial control bus 422.

Figure 6:
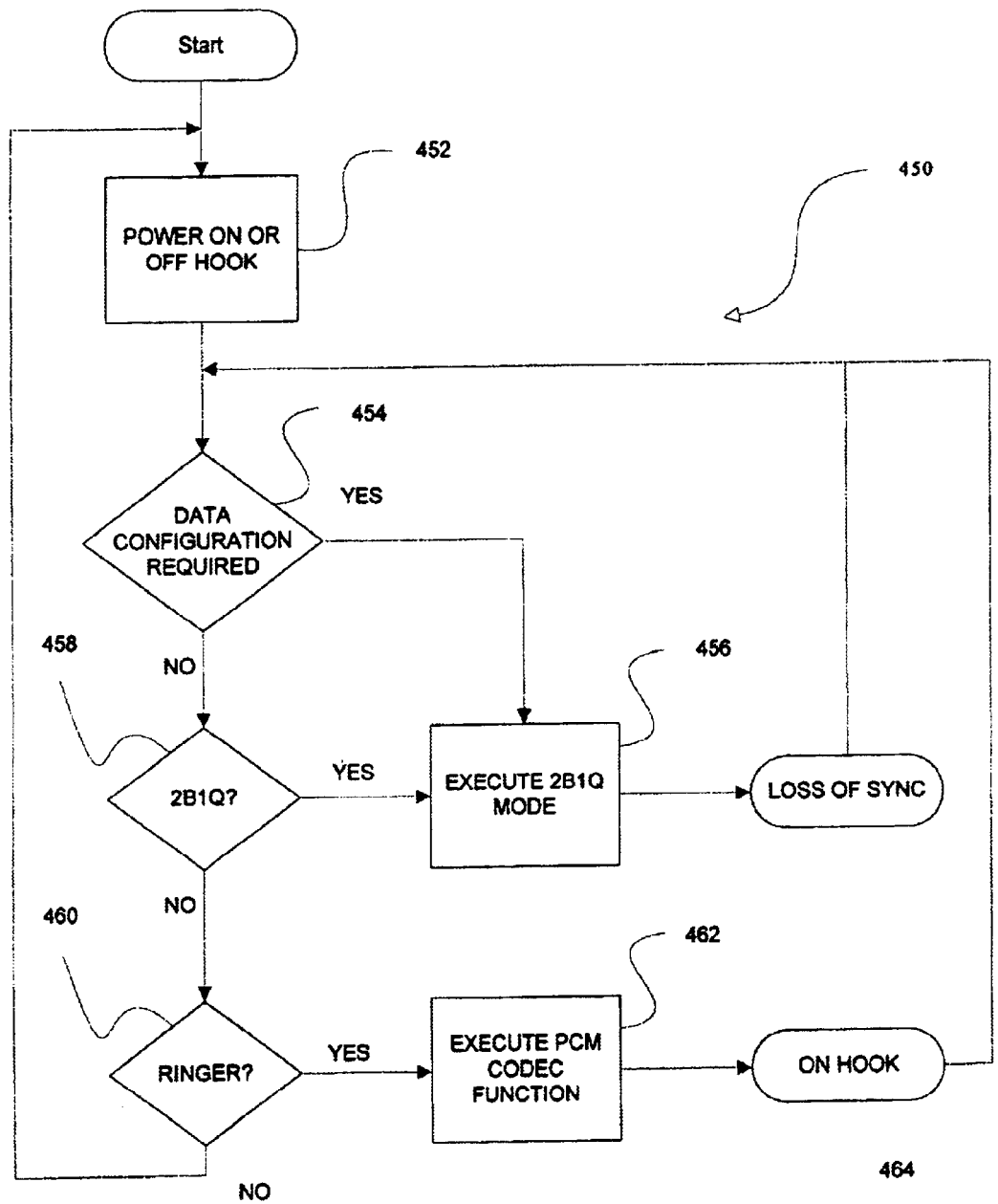
FIG. 6 is a flow diagram illustrating a process in accordance with the present invention for determining the type of end-user device coupled with one of the line cards of the remote terminal.

FIG. 6 shows a flow diagram at 450 illustrating a process in accordance with the present invention for determining the type of end-user device coupled with one of the line cards 110 (FIG. 1) via an end-user port. The depicted process begins with step 452 in which the device, that is the end-user device, is activated by turning the power on as in the case of an ISDN device, or picking up the telephone. From step 452, the process proceeds to 454 at which the DSP determines whether any data configuration is required for communicating with the end-user device. The default status is for voice communication, however, for an ISDN device, data configuration is required (2B1Q-ISDN). If it is determined at 454 that data configuration is required, the process proceeds to step 456 in which the DSP 120 executes 2B1Q mode. If it is determined at 454 that data configuration is not required, the process proceeds to step 458 in which the DSP sends a message to the end-user device and waits for a received message to be analyzed in order to determine if the end-user device is an ISDN type of device. If it is determined at 458 that 2B1Q mode is to be executed, the process proceeds to step 456 to execute 2B1Q mode. From step 456, the process terminates 2B1Q mode, initiated in step 456, upon loss of synchronization that is upon losing communication signals with the ISDN device, after which the process proceeds back to 454.

If it is determined at 458 that the end-user device is not an ISDN device and that 2B1Q is not to be executed, the process proceeds to step 460 in which the DSP determines whether there is a "RINGER" that is whether the end-user device is a telephone. This determination is made by sending a signal to the end-user device and reading the echo signal. If it is determined at 460 that the end-user device is a telephone, the process proceeds to step 462 in which the DSAP executes pulse code modulation (PCM) CODEC functions. From step 462, communication with the telephone is executed until the telephone is placed on the hook in step 463, after which the process proceeds back to step 454.

Figure 7:
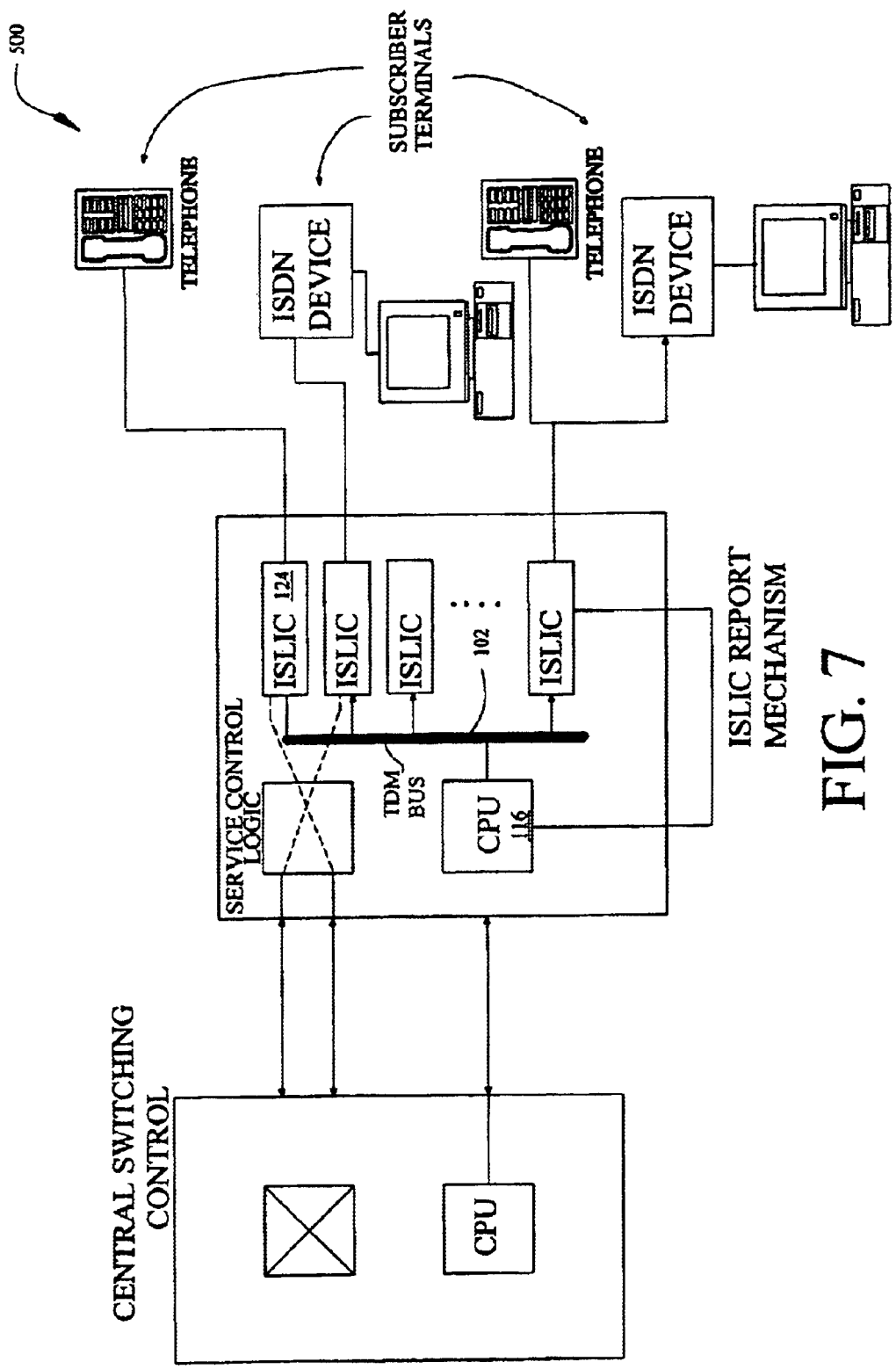
FIGS. 7–12 show further details of the line card.

FIG. 7 shows a block diagram at 500 illustrating an integrated SLIC applied in an access node or line interface unit. A service logic under control of the access node can configure the ISLIC circuit to provide either ISDN or POTS service. A reporting mechanism for ISLIC can inform the CPU 116 of the access node about the type of remote terminal. The CPU 116 can provide in real time the required network interface. A mapping mechanism is established to map both ISDN and POTS services to a single port.

Figure 8:
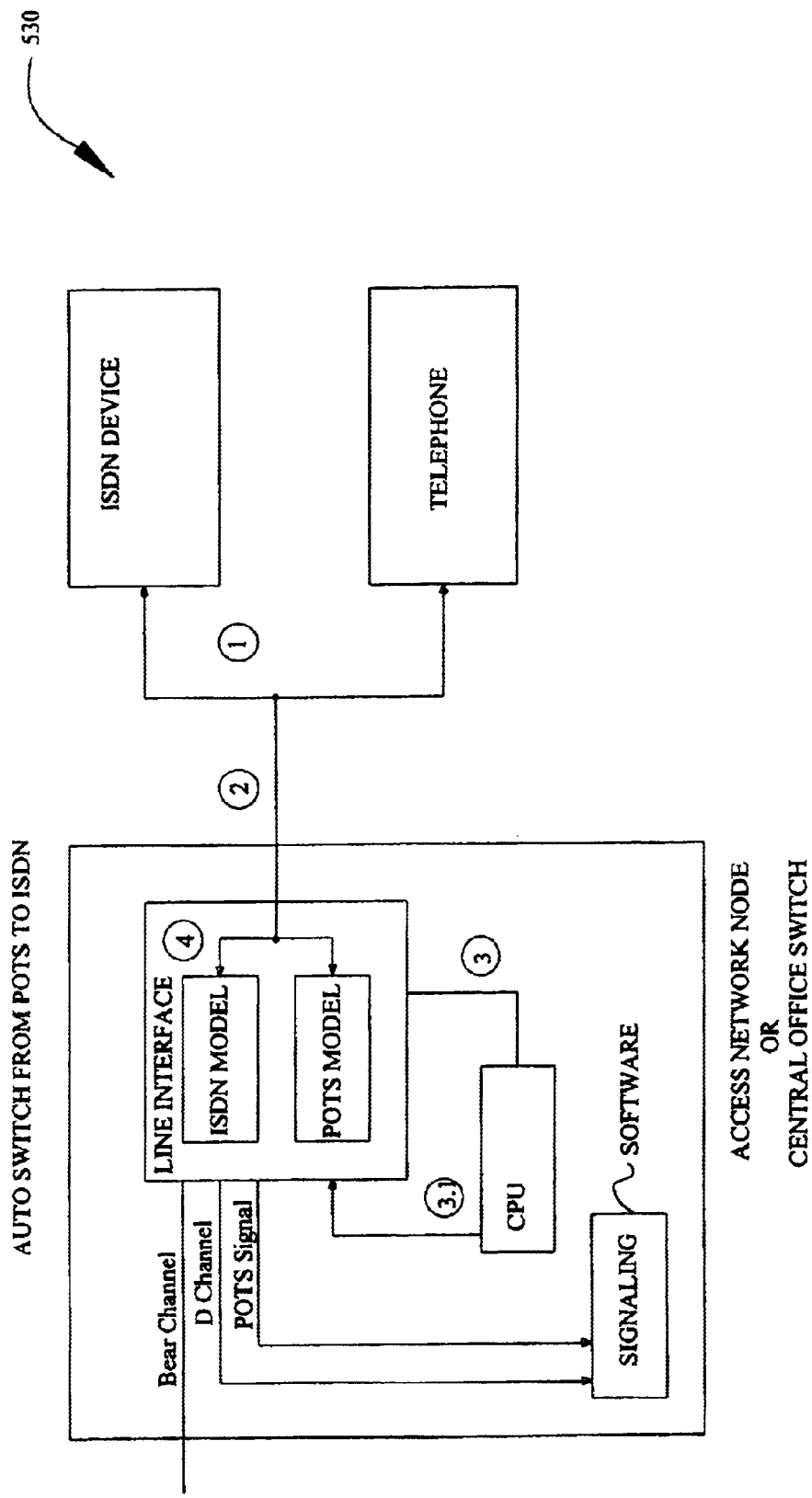

FIG. 8 shows a block diagram at 530 of an automatic switching implementation for automatically switching between POTS and ISDN. An ISDN terminal 532 is coupled with the access node controller switch via a wire pair loop. The ISLIC sends a series of 2B1Q synchronization codes to initiate wake-up of the ISDN device 532. The ISLIC informs the CPU 116 that an ISDN end terminal is connected to the end-user port. The CPU checks the allowable configuration. The CPU then controls the ISLIC to switch from POTS to ISDN.

Figure 9:
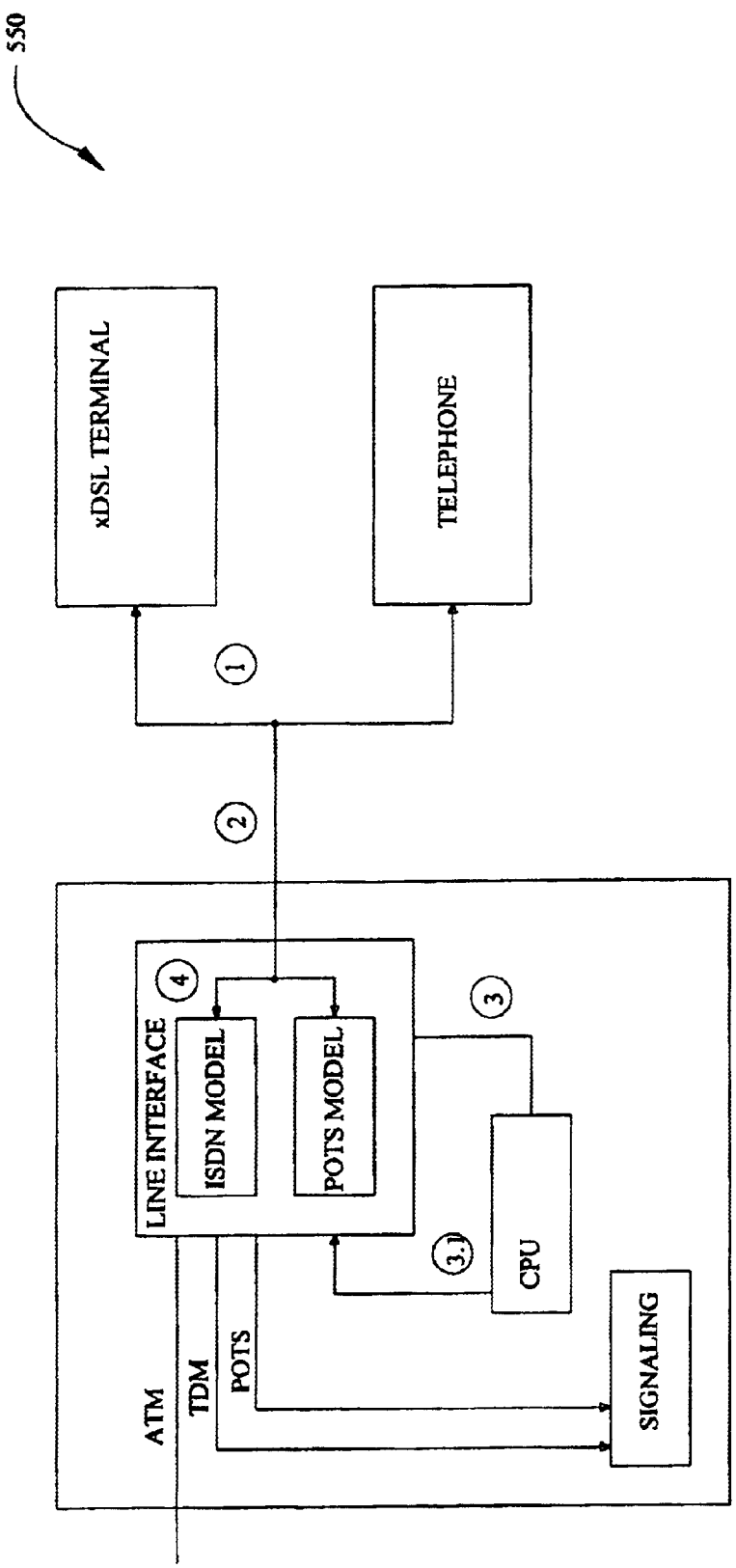

FIG. 9 shows a block diagram at 550 illustrating functioning of the ISLIC to automatically detect an xDSL terminal. An xDSL terminal 552 is connected to the line card via a loop. The ISLIC sends a series of xDSL synchronization codes to initiate waking up of the xDSL terminal 552. The ISLIC informs the CPU 116 that an xDSL terminal 552 is connected to the line card. The CPU then checks the allowable configuration. Then the CPU causes the ISLIC to switch from POTS to xDSL. The CPU connects ATM or TDM bus depending on which configuration.

Figure 10A:
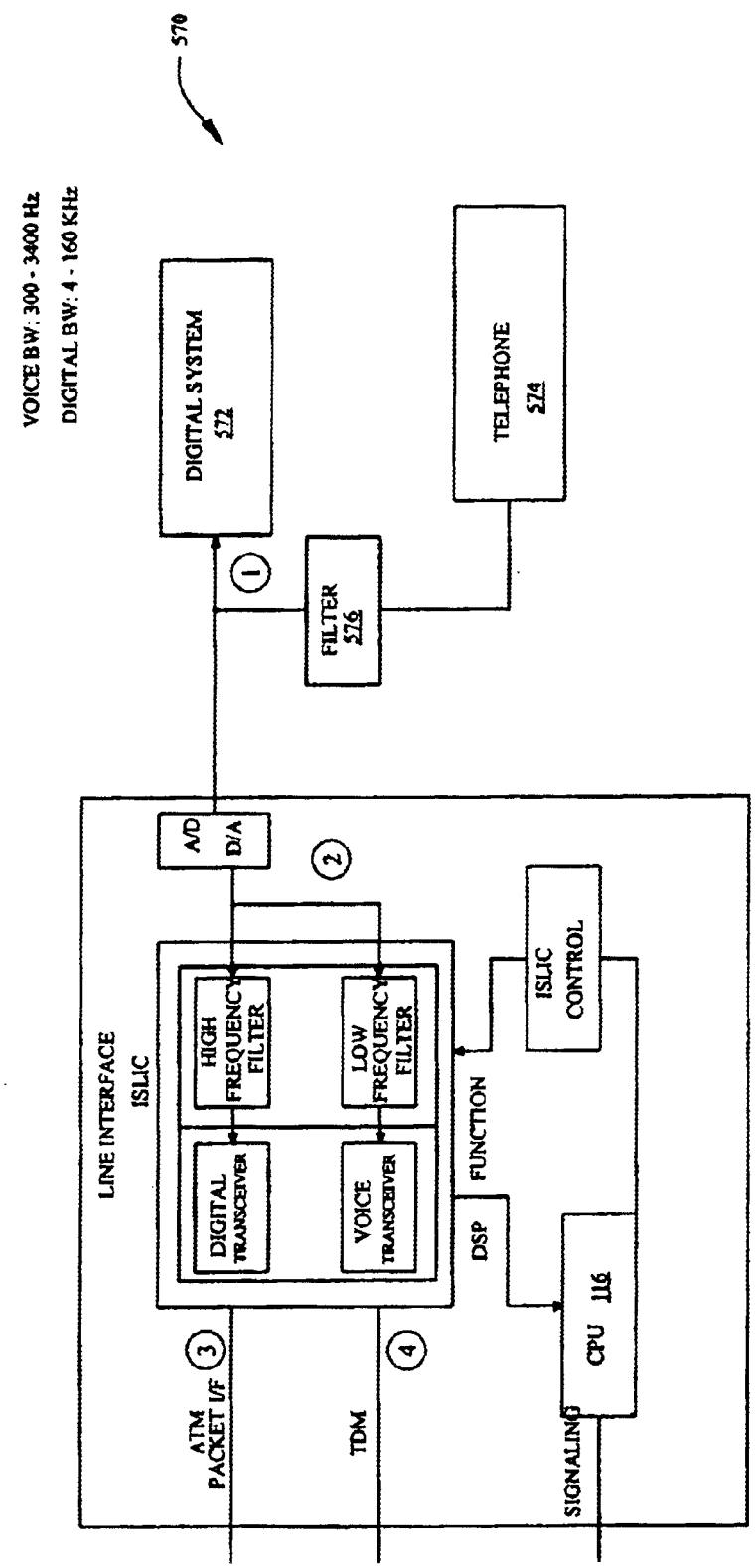

FIG. 10A shows a logical block diagram at 570 illustrating functioning of an ISLIC in accordance with the present invention applied to function with a data over voice application. A digital system 572 is connected with a port of the line card. A telephone 574 is also connected with the same port of the line card via a filter 576. The line contains both ordinary voice signals from the telephone 574 and digital bandwidth signals. The ordinary voice signals from the telephone are between 334 kHz. The digital bandwidth signals are between 4 kHz and 160 kHz and higher. A high speed analog to digital circuit (A-D circuit) is connected to both the voice and digital data to the DSP. Data traffic enters the system and is output to the ATM or packet bus. Voice traffic enters the TDM bus.

Figure 10B:
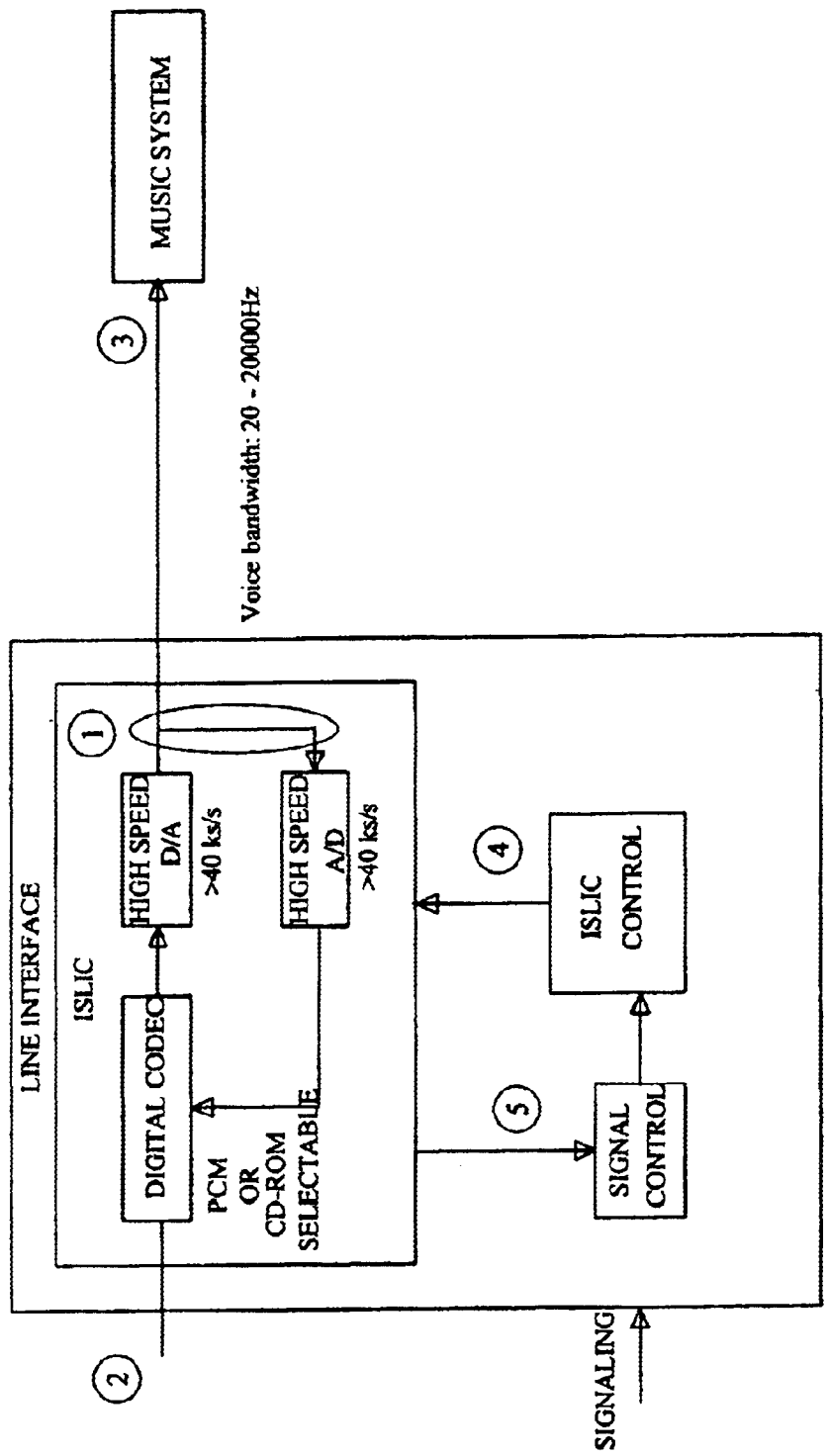

FIG. 10B shows a block diagram at 580 of a line interface card 582 providing improved voice quality CODEC functions in accordance with the present invention, the card 582 having a port 583 coupled for communication with a music system 584 via a loop which provides a voice bandwidth in a range between 20 Hz and 20 KHz. The line interface card 582 includes: an integrated subscriber line interface circuit (ISLIC) 586, an ISLIC control unit 588 coupled for communication with ISLIC 586, and a signal control unit 590 coupled for communication with ISLIC 586.

The ISLIC 586 includes: a digital CODEC unit 591 providing selectable encoding and decoding functions in a selected one of PCM and CD-ROM formats; a high speed digital to analog converter unit (D/A unit) 592 having an input port coupled with an output port of the CODEC unit 591, and an output port coupled with port 583 of the card via a node 593, the D/A unit 592 being operative to provide greater than 40,000 samples per second; and a high speed analog to digital converter unit (A/D unit) 594 having an input port coupled with the output port of the D/A unit 592 via node 593, and an output port 595 coupled to provide a signal to the CODEC unit 591, the All) unit 594 being operative to provide greater than 40,000 samples per second.

The high SPEED A/D unit 593 samples an incoming voice signal received via port 583 from the music system 584, and therefore, the ISLIC 586 provides improved PCM coding and improved voice quality. The digital CODEC unit 591 may utilize a common standard coding scheme such as the CD-ROM coding scheme to achieve 200 Hz–20 KHz voice response. The loop may be connected to a high fidelity voice source. The ISLIC control unit 588 may provide either classic PCM CODEC functions or improved CODEC functions. The ISLIC 586 may also employ an auto-sensing circuit for making end to end adjustments.

Figure 11:
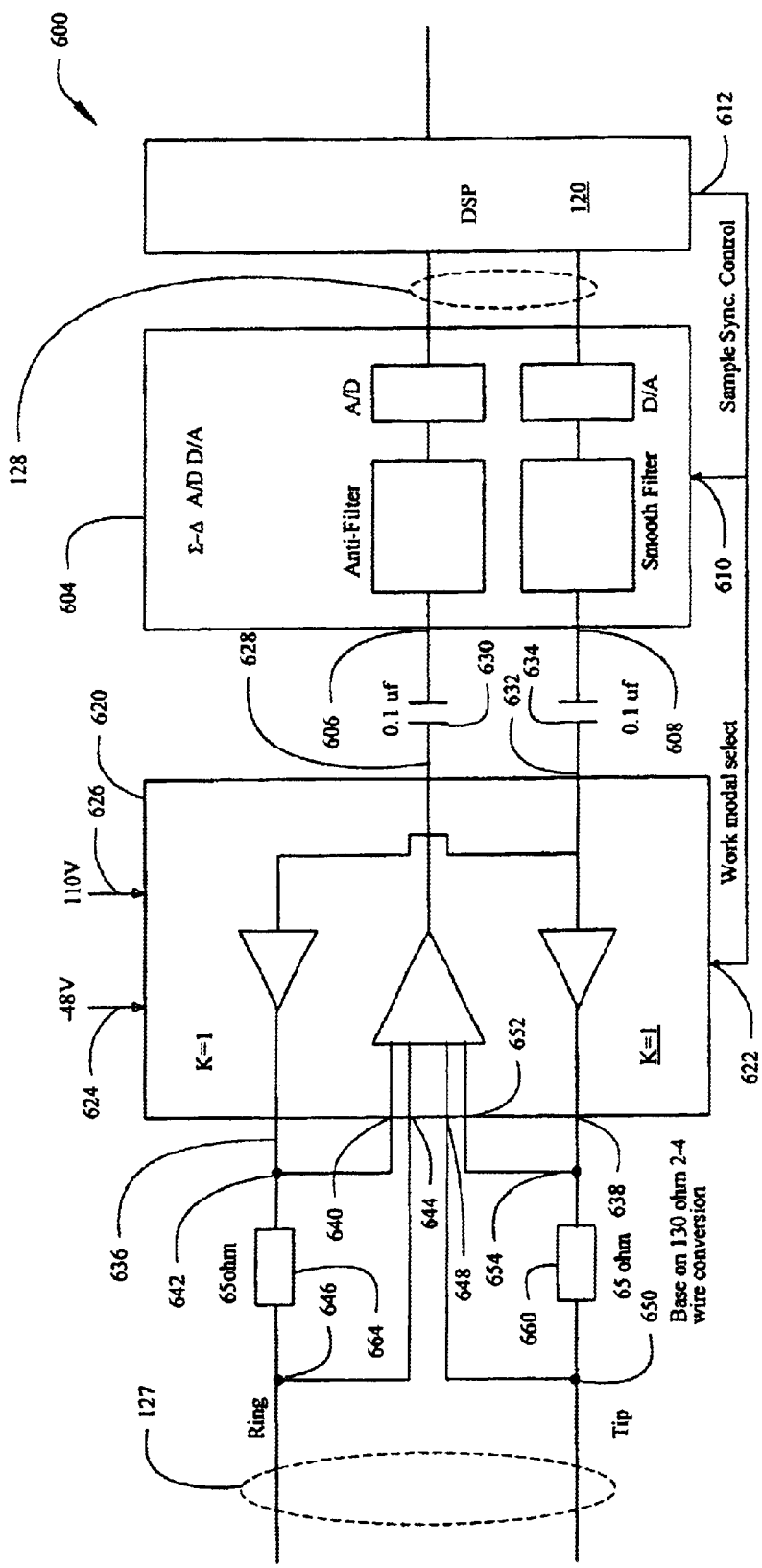

FIG. 11 shows a block diagram at 600 of another embodiment of the line card in accordance with the present invention. In the depicted embodiment, the line card includes a sum and difference analog to digital and digital to analog unit 604 having a port 606, a port 608, a control port 610 connected to a port 612 of the DSP 120; a amplifying unit 620 having a input 624 coupled to receive negative 48 volts, an input 626 coupled to receive 110 volts, a port 628 coupled to the port 606 of unit 604 via a 0.1 microfarad capacitor 630, a port 632 coupled to the port 608 of unit 604 via a second 0.1 microfarad capacitor 634; a port 636 coupled to a node 642, a node 640 coupled the node 642, an input 644 coupled to a node 646, a third input 648 coupled to a node 650, and a fourth input 652 coupled to a node 654. The node 642 is coupled to the node 646 via a 65 ohm load. The node 650 is coupled to the node 654 via a second 65 ohm load 660. The node 646 is coupled to receive the ring signal via port 127, and the node 650 is coupled to receive the tip signal via port 127.

Figure 12:
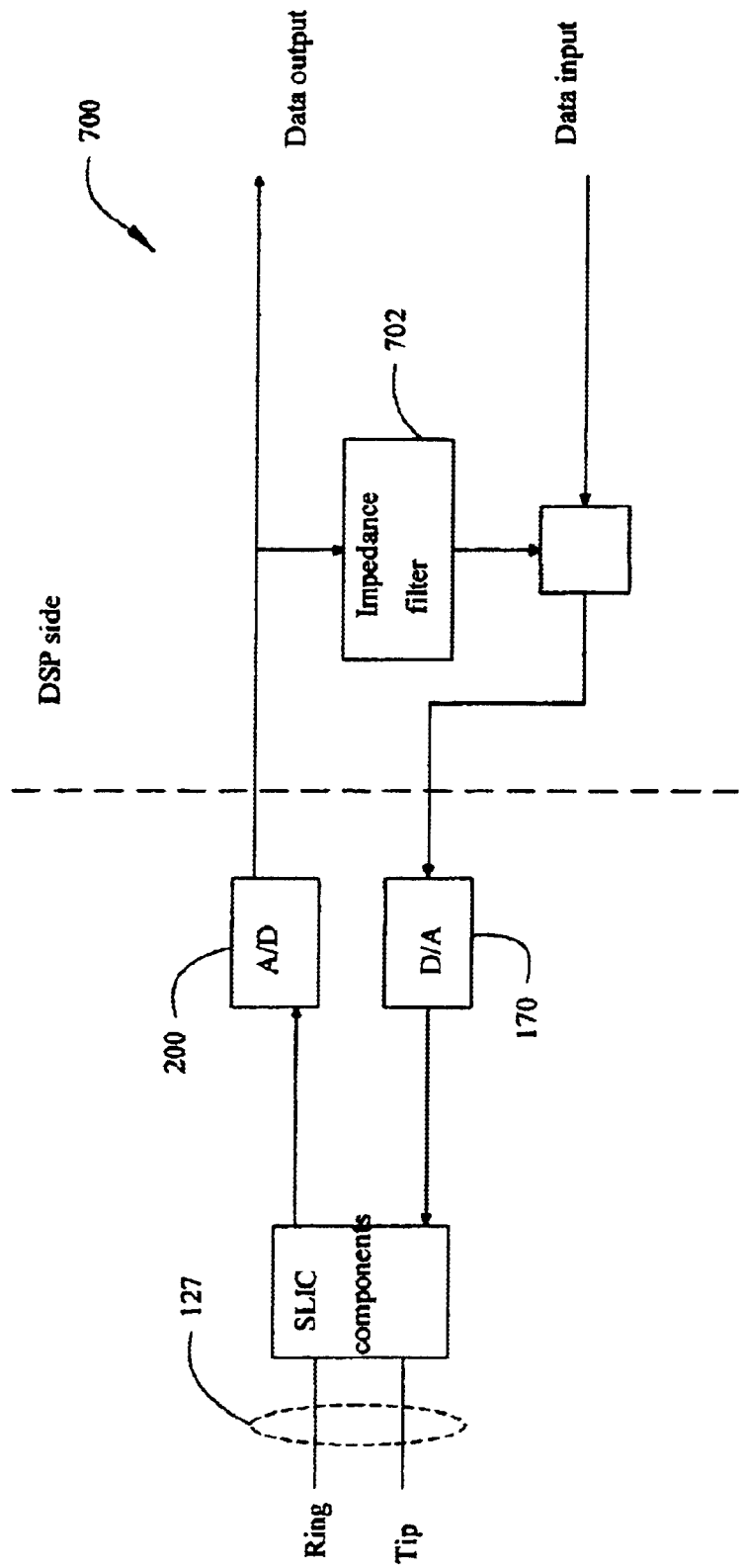

FIG. 12 shows a block diagram at 700 illustrating impedance filtering and balancing functions of the line card of the present invention. The depicted embodiment includes an impedance filter unit 702, which in the preferred embodiment is implemented using software executed over the digital signal processor 120, the filter having an input 704 coupled to receive signals from the A-D converter.

Relationship (1), below, provides an expression for an adaptive impedance model according to the present invention.

$$Y = \sum_{i=1}^{i=n} Ai * Xi \quad (1)$$

Varying Ai provides varies the input impedance, and output impedance. A terminal balance return loss (TBRL), and terminal balance loss (TBL) can therefore be minimized to a least value between two directions. Filter step is n; change n can be difference precision requirement. Generally, n ranges between 4 and 8. The function described relationship (1) is achieved using software executed by the digital signal processor. Therefore, the impedance requirements governed by varying National Standards, may be met be adjusting the impedance.

In the depicted embodiment, the A/D conversion circuit, and D/A conversion circuit are implemented using the Σ-Δ modal. Because we use Σ-Δ model, so a lot of things can processed by DSP software.

The A/D direction anti-filter is very small, and is therefore easily integrated at a low cost. In one embodiment, ISDN 'U' is defined by 80 k sample/13 bits. In one embodiment, SLIC voice is defined by 20 k sample/15 bits or 40 k sample/14 bits.

Because the sample speed is higher than 8 khz, it is very easy to achieve impedance. When that change to ISDN 'U' interface, front circuit fix 130 ohm.

For the D/A direction, ISDN 'U' is 320 k sample/8 bits, and SLIC voice is 20 k sample/13 bits.

In conclusion, as a PCM CODEC, the line card provides: coding of 13 bit voice data into either a-law or μ-law PCM coding; band-pass digital filtering and equalization of the voice signal; and impedance matching functions that can support 600 or 900 Ohms. As an ISDN echo cancelling transceiver, the line card provides: 2B1Q modulation and demodulation, dynamic adaptive echo cancellation, and automatic level adjustment and control. Finally, the line card provides loop calibration functions including loop balance compensation provided by the digital signal processing software.

Although the present invention has been particularly shown and described above with reference to a specific embodiment, it is anticipated that alterations and modifications thereof will no doubt become apparent to those skilled in the art. It is therefore intended that the following claims be interpreted as covering all such alterations and modifications as fall within the true spirit and scope of the invention.

What is claimed is:

1. An adaptive subscriber line interface system for use in a telecommunications network providing a plurality of telecommunications services, the interface system being operative to provide an adaptive interface between a node of the network and a currently connected one of a plurality of different types of end user devices, the currently connected end user device being adapted for communication via a corresponding one of the services provided by the network, the interface circuit comprising:

a digital signal processor operatively coupled for communication via the network directly with a central office terminal and through a single adaptive interface circuit between said digital signal processor and the currently connected end user device;

said adaptive interface circuit having memory means for storing,
      a first interface mode program for configuring said digital signal processor to provide a first set of interface functions associated with a first one of the services,
      a second interface mode program for configuring said digital signal processor to provide a second set of interface functions associated with a second one of the services, and
      a detection program for configuring said digital signal processor to automatically determine the corresponding service required by the currently connected end user device based on signals received from the currently connected end user device via said adaptive interface circuit; and said adaptive interface circuit including a two-wire to four-wire conversion circuit operable in a first service mode if the currently connected end user device requires said first service, and also being operable in a second service mode if the currently connected end user device requires said second service.

2. An adaptive subscriber line interface system as recited in claim 1 wherein said first service is a plain old telephone service (POTS), and said second service is an integrated services digital network service (ISDN service).

3. An adaptive subscriber line interface system as recited in claim 1 wherein said adaptive interface circuit further comprises:

a digital to analog converter for receiving digital signals from said digital signal processor, and being operative to convert said digital signals to converted analog signals and to provide said converted analog signals to said currently connected end user device; and an analog to digital converter for receiving analog signals from said currently connected end user device, and being operative to convert said analog signals to converted digital signals and to provide said converted digital signals to said digital signal processor.

4. An adaptive subscriber line interface system as recited in claim 1 wherein said adaptive interface circuit further comprises a protection circuit coupled for communication with said currently connected end user device.

5. In an adaptive subscriber line interface system for use in a network providing a plurality of services, the interface system being operative to provide an adaptive interface between the network and a currently connected one of a plurality of different types of end user devices, the currently connected device being adapted for communication in accordance with a corresponding one of the services, the interface circuit including a digital signal processor operatively coupled for communication via the network directly with a central office terminal and through a single adaptive interface circuit between the processor and the currently connected end user device, the processor being capable of executing a first interface mode process for providing a first set of interface functions associated with a first one of the services, and a second interface mode process for providing a second set of interface functions associated with a second one of the services, a detection process for determining the corresponding service required by the currently connected end user device, the detection process comprising the steps of:

sending a first message from the digital signal processor through the single adaptive interface circuit to the currently connected end-user device;

receiving a signal from the currently connected end-user device through the single adaptive interface circuit;

analyzing said received signal to determine the corresponding one of the first and second services for which the currently connected end user device is adapted to communicate; and, executing the corresponding one of the first and second interface mode programs in the digital signal processor for communication through the single adaptive interface circuit.

6. In an adaptive subscriber line interface system as recited in claim 5 wherein said first service is a plain old telephone service (POTS), and said second service is an integrated services digital network service (ISDN service).

7. An adaptive subscriber line interface system for use in a network providing a plurality of services, the interface system being operative to provide an adaptive interface between the network and a currently connected one of a plurality of different types of end user devices, the currently connected device being adapted for communication in accordance with a corresponding one of the services, the interface circuit including a digital signal processor operatively coupled for communication via the network directly with a central office terminal and through a single adaptive interface circuit between the processor and the currently connected end user device, the processor being capable of executing a first interface mode process for providing a first set of interface functions associated with a first one of the services, and a second interface mode process for providing a second set of interface functions associated with a second one of the services, a detection process for determining the corresponding service required by the currently connected end user device, the detection process comprising the steps of:

sending a first message from the digital signal processor through the single adaptive interface circuit to the currently connected end-user device;

receiving a signal from the currently connected end-user device through the single adaptive interface circuit;

analyzing said received signal to determine the corresponding one of the first and second services for which the currently connected end user device is adapted to communicate; and, if it is determined that the currently connected end user device is adapted to communicate via said plain old telephone service, executing a chosen one of said first and second interface mode processes providing pulse code modulation (PCM) CODEC functions.

8. An adaptive subscriber line interface system for use in a telecommunications network providing a plurality of telecommunications services, the interface system being operative to provide an adaptive interface between a node of the network and a currently connected one of a plurality of different types of end user devices, the currently connected end user device being adapted for communication via a corresponding one of the services provided by the network, the interface circuit comprising:

a digital signal processor operatively coupled for communication via the network directly with a central office terminal and through a single adaptive interface circuit between said digital signal processor and the currently connected end user device;

said single adaptive interface circuit including memory means for storing,
a first interface mode program for configuring said digital signal processor to provide a first set of interface functions associated with a first one of the services,
a second interface mode program for configuring said digital signal processor to provide a second set of interface functions associated with a digital subscriber line service (DSL service), and
a detection program for configuring said digital signal processor to automatically determine the corresponding service required by the currently connected end user device based on signals received from the currently connected end user device via said adaptive interface circuit; and said adaptive interface circuit including a two-wire to four-wire conversion circuit operable in a first service mode if the currently connected end user device requires said first service, and also being operable in a second service mode if the currently connected end user device requires said second service.

9. An adaptive subscriber line interface system as recited in claim 8 wherein said first service is a plain old telephone service (POTS).

10. An adaptive subscriber line interface system as recited in claim 8 wherein said first service is an integrated services digital network service (ISDN service).

11. In an adaptive subscriber line interface system for use in a network providing a plurality of services, the interface system being operative to provide an adaptive interface between the network and a currently connected one of a plurality of different types of end user devices, the currently connected device being adapted for communication in accordance with a corresponding one of the services, the interface circuit including a digital signal processor operatively coupled for communication via the network directly with a central office terminal and a single adaptive interface circuit between the processor and the currently connected end user device, the processor being capable of executing a first interface mode process for providing a first set of interface functions associated with a first one of the services, and a second interface mode process for providing a second set of interface functions associated with a digital subscriber line service (DSL service), a detection process for determining the corresponding service required by the currently connected end user device, the detection process comprising the steps of:

sending a first message from the digital signal processor through the single adaptive interface circuit to the currently connected end-user device;

receiving a signal from the currently connected end-user device through the single adaptive interface circuit;

analyzing said received signal to determine the corresponding one of the first and second services for which the currently connected end user device is adapted to communicate; and executing the corresponding one of the first and second interface functions in the digital signal processor for communication through the single adaptive interface circuit.

12. In an adaptive subscriber line interface system as recited in claim 11 wherein said first service is a plain old telephone service (POTS).

13. In an adaptive subscriber line interface system as recited in claim 11 wherein said first service is an integrated services digital network service (ISDN service).

14. An adaptive subscriber line interface system for use in a telecommunications network providing a plurality of telecommunications services, the interface system being operative to provide an adaptive interface between a node of the network and a currently connected one of a plurality of different types of end user devices, the currently connected end user device being adapted for communication via a corresponding one of the services provided by the network, the interface circuit comprising:

a digital signal processor operatively coupled for communication via the network directly with a central office terminal;

an adaptive interface circuit coupled for communication with said digital signal processor, and providing an adaptive interface between said digital signal processor and the currently connected end user device;

memory means for storing,
a first interface mode program for configuring said digital signal processor to provide a first set of interface functions associated with a first one of the services comprising a plain old telephone service (POTS),
a second interface mode program for configuring said digital signal processor to provide a second set of interface functions associated with a second one of the services comprising an integrated services digital network service (ISDN service), and
a detection program for configuring said digital signal processor to automatically determine the corresponding service required by the currently connected end user device based on signals received from the currently connected end user device via said adaptive interface circuit; and said adaptive interface circuit including a two-wire to four-wire conversion circuit operable in a first service mode if the currently connected end user device requires said first service, and also being operable in a second service mode if the currently connected end user device requires said second service.

15. An adaptive subscriber line interface system for use in a telecommunications network providing a plurality of telecommunications services, the interface system being operative to provide an adaptive interface between a node of the network and a currently connected one of a plurality of different types of end user devices, the currently connected end user device being adapted for communication via a corresponding one of the services provided by the network, the interface circuit comprising:

a digital signal processor operatively coupled for communication via the network directly with a central office terminal;

an adaptive interface circuit coupled for communication with said digital signal processor, and providing an adaptive interface between said digital signal processor and the currently connected end user device;

memory means for storing, a first interface mode program for configuring said digital signal processor to provide a first set of interface functions associated with an integrated services digital network service (ISDN service), a second interface mode program for configuring said digital signal processor to provide a second set of interface functions associated with a digital subscriber line service (DSL service), and a detection program for configuring said digital signal processor to automatically determine the corresponding service required by the currently connected end user device based on signals received from the currently connected end user device via said adaptive interface circuit; and said adaptive interface circuit including a two-wire to four-wire conversion circuit operable in a first service mode if the currently connected end user device requires said first service, and also being operable in a second service mode if the currently connected end user device requires said second service.

16. In an adaptive subscriber line interface system for use in a network providing a plurality of services, the interface system being operative to provide an adaptive interface between the network and a currently connected one of a plurality of different types of end user devices, the currently connected device being adapted for communication in accordance with a corresponding one of the services, the interface circuit including a digital signal processor operatively coupled for communication via the network directly with a central office terminal, an adaptive interface circuit coupled for communication with the processor, the circuit providing an adaptive interface between the processor and the currently connected end user device, the processor being capable of executing a first interface mode process for providing a first set of interface functions associated with a plain old telephone service (POTS) and a second interface mode process for providing a second set of interface functions associated with an integrated services digital network service (ISDN service), a detection process for determining the corresponding service required by the currently connected end user device, the detection process comprising the steps of:

sending a first message to the currently connected end-user device;

receiving a signal from the currently connected end-user device; and analyzing said received signal to determine the corresponding one of the first and second services for which the currently connected end user device is adapted to communicate.

17. In an adaptive subscriber line interface system for use in a network providing a plurality of services, the interface system being operative to provide an adaptive interface between the network and a currently connected one of a plurality of different types of end user devices, the currently connected device being adapted for communication in accordance with a corresponding one of the services, the interface circuit including a digital signal processor operatively coupled for communication via the network with a central office terminal, an adaptive interface circuit coupled for communication with the processor, the circuit providing an adaptive interface between the processor and the currently connected end user device, the processor being capable of executing a first interface mode process for providing a first set of interface functions associated with an integrated services digital network service (ISDN service), and a second interface mode process for providing a second set of interface functions associated with a digital subscriber line service (DSL service), a detection process for determining the corresponding service required by the currently connected end user device, the detection process comprising the steps of:

sending a first message to the currently connected end-user device;

receiving a signal from the currently connected end-user device; and analyzing said received signal to determine the corresponding one of the first and second services for which the currently connected end user device is adapted to communicate.

\* \* \* \* \*